Dec. 18, 1928.
R. H. WAPPLER
1,695,672
REARWARD VISION SURGICAL TELESCOPE
Filed July 22, 1927
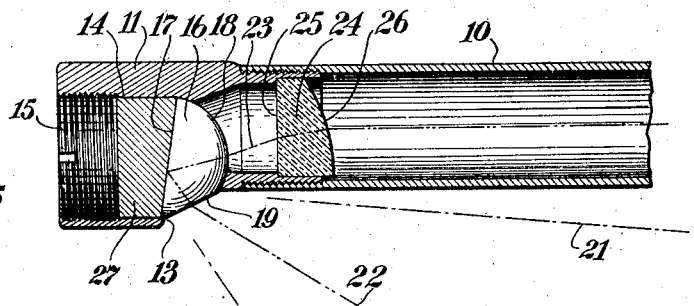
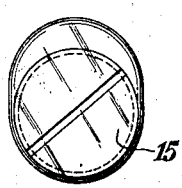
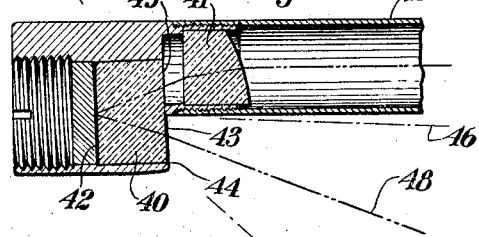
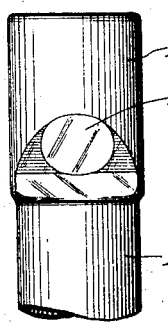
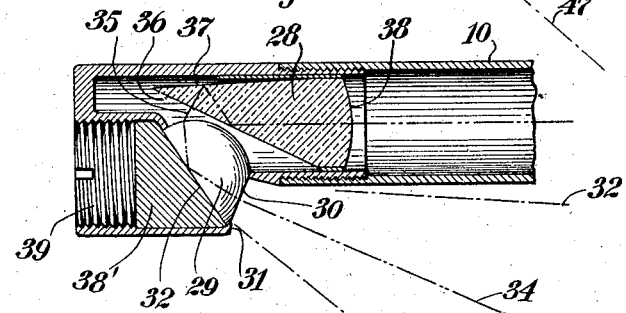
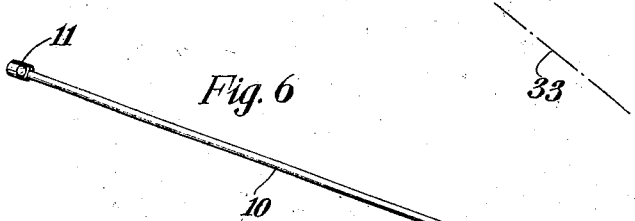
INVENTOR
Reinhold H. Wappler,
BY
ATTORNEY Patented Dec. 18, 1928.

1,695,672

UNITED STATES PATENT OFFICE.

REINHOLD H. WAPPLER, OF YONKERS, NEW YORK, ASSIGNOR TO AMERICAN CYSTO-SCOPE MAKERS, INC., OF LONG ISLAND CITY, NEW YORK, A CORPORATION OF NEW YORK.

REARWARD-VISION SURGICAL TELESCOPE.

Application filed July 22, 1927. Serial No. 207,608.

My present invention relates generally to surgical instruments, and has particular reference to telescopes for use alone or with endoscopes and the like.

In the examination of certain interior organs of the body, by the insertion into body passages of telescopic tubes, it is in many cases essential to command a field of vision rearwardly disposed with respect to the inserted tube. For example, the examination of the upper wall of the stomach by means of a telescopic device inserted through the alimentary canal necessitates the provision of means for looking obliquely rearwardly from the inner end of the inserted tube. It is an object of my present invention to provide a telescopic tube of this character, the construction being such that the tube may be used either by itself or in association with suitably fenestrated endoscopes or other specula.

Telescopic tubes of this character must be as small as possible, from the standpoint of cross-sectional area, they must be devoid of all unnecessary projecting parts which might interfere with their smooth insertion and removal, and they must at the same time be capable of commanding a field of vision which is as rearward as possible. However, although rear vision is desirable, the field must not be too limited and should if possible include an obliquely rearward field. Furthermore, since a change of medium will change angles of refraction, an efficient telescope must be designed in a manner whereby a change of medium will not seriously impair its utility.

Another important requirement of telescopes of this character is the absence of any "tumbling" of the image when the telescopic tube is rotated about its axis.

It is an object of the present invention to provide a device of this character, and it is a feature of my invention to provide a structure which is simple and hence inexpensive to manufacture, small and compact, and highly efficient from the standpoint of light transmission.

A particular feature of my invention resides in the combined employment of a reflecting objective, which commands a rearwardly oblique field of vision, and an auxiliary optical device for effecting the proper longitudinal transmission of light rays through the telescopic tube to the eye-piece at the outer end.

It is another feature of my invention to arrange and construct the reflecting objective in such a manner that the light rays entering it will be directed obliquely backwards into the telescopic tube itself, the auxiliary optical means being of such a character as to redirect these obliquely directed rays into a substantially longitudinal direction.

In one embodiment of my invention, the auxiliary optical means comprises an eccentric lens, i. e., one whose surfaces are defined by an eccentric portion of a theoretical symmetrical lens. In a second embodiment, the auxiliary means comprises a double-acting prism. In the one case, the eccentric lens effects by itself no additional inversion of the image; and in the other case, the double action of the prism effects a double and hence self-neutralizing inversion leading to the same ultimate result. By providing for either one reflection or three reflections, and not for two or four, I am enabled to provide an instrument which is not characterized by any tumbling of the image.

Briefly, my invention contemplates the provision of a telescopic tube having a slightly enlarged forward end, the end having an opening arranged in its rearward exposed surface. In one form of my invention, the reflecting objective comprises a substantially hemispherical lens, the plane surface of which constitutes the reflecting surface. Where such a lens is employed, a portion of its curved surface is flattened off and arranged in said opening.

In another form of my invention, the hemispherical lens may be replaced by an ordinary plano lens wherein one surface acts as the reflectitng surface and the opposite parallel surface is arranged partly in said opening and partly in the tube itself.

For the attainment of the foregoing objects and such other objects as may hereinafter appear or be pointed out, I have illustrated three forms of my invention in the accompanying drawings in which—

Fig. 1 is a side cross-sectional view of the forward end of a telescopic tube embodying the feature of my invention;

Fig. 2 is an end view thereof;

Fig. 3 is a front view thereof;

Figs. 4 and 5 are views similar to Fig. 1, showing modified constructions; and

Fig. 6 is a perspective view of a complete telescopic device typical of the character to which my invention relates.

Referring for the moment to Figure 6, it will be noted that a somewhat elongated telescopic tube 10 is provided at its forward end with an enlarged portion 11 and at its rear end with a suitable eye-piece 12. It will be understood that other connections and auxiliary parts may be associated with the rear end 12, the form illustrated in nowise limiting or affecting the present invention.

Referring to Figure 1, it will be noted that the enlarged end 11 is preferably constructed as an attachable element which may be screw-threaded into the body of the tube 10. Although the portion 11 may be denoted generally as an enlarged portion, nevertheless it will be noted, particularly upon reference to Figure 2, that the enlargement extends in one direction only. In other words, the main portion of the end 11 is substantially concentric with the tube 10, forming a substantial continuation thereof; the general cross-sectional configuration of the end being, however, elliptical and thereby providing the enlargement referred to.

That portion of the elliptical end which extends beyond the peripheral bounds of the tube 10 is provided at its rear exposed surface with an opening 13, this opening being arranged along a plane oblique to the longitudinal axis of the tube. The elliptical end portion 11 is also provided with an offset bore 14, the outer portion of which is threaded to receive a suitable plug 15 after the objective has been positioned.

A substantially hemispherical objective 16 is inserted through the bore 14 into the position shown in Figure 1. The forward or plane surface 17 of the objective is disposed toward the outer end of the bore 14. The rear or curved surface 18 of the objective is disposed toward the eye-piece 12, and it will be noted that a portion 19 of this curved surface has been flattened out. The portion which is flattened lies in a plane forming an acute angle with the plane surface 17 and is arranged to span the opening 13. The proper grinding and positioning of the objective 16 in substantially the manner illustrated will result in the reception of light rays from a rearwardly oblique field of vision and the transmission of these rays obliquely backward into the body of the tube 10. More particularly, the field of vision which the objective 16 commands is indicated approximately by the outer and inner boundary lines 20 and 21 respectively. The path of a ray passing through the axis of this field of vision is denoted approximately by the dot and dash line 22. When this ray enters the surface 19, it is refracted toward the plane surface 17 as shown. This surface 17 is designed to reflect the rays and may be silvered if desired. The reflected ray 23 is directed rearwardly in an oblique manner into the body of the tube 10.

To receive the ray 23 (and the other rays traveling a substantially similar and corresponding path), and to transmit these rays in a substantially longitudinal manner through the tube to the eye-piece, I provide auxiliary optical means which is shown in Figure 1 in the form of an eccentric lens 24. The lens illustrated is a plano-convex lens having a plane surface 25 forwardly disposed and a convex surface 26 rearwardly disposed. The surfaces 25 and 26 lie along the surfaces which would be defined by an off-center or eccentric portion of a theoretical symmetrical plano-convex lens of a diameter larger than that of the lens 24. The thickest portion of the lens 24 is disposed toward the opening 13, and the effect of the lens 24 is to receive the rays reflected from the surface 17 and to transmit these rays rearwardly in a substantially longitudinal manner through the tube 10.

A suitable backing 27 is preferably positioned in front of the objective 16, and the plug 15 bears upon this backing and assists in holding the lens 16 in position. The plug 15 is also arranged with its outer surface flush with the forward outer surface of the entire device so that the insertion of the instrument through a body canal will not be impeded nor rendered difficult.

In Figure 4 I have illustrated a modified form which replaces the hemispherical reflecting objective 16 by a plano lens 40. In the employment of such an objective, the absence of the rounded surface of the hemisphere must be compensated for by a thickening of the eccentric lens 41 corresponding to the lens 24 of Figure 1. The element 40 has a silvered reflecting surface 42 arranged forwardly with respect to the tube as a whole. The rear parallel surface of the element 40 has a portion 43 arranged in the opening 44 (which corresponds to the opening 13 of Figure 1), and a portion 45 arranged in the tube proper. The element 40 is positioned with its parallel faces substantially perpendicular to the tube axis, although the inclination may be varied slightly in one or the other direction depending upon the degree of obliqueness which it is desired to view.

The field of vision which the element 40 commands is a decidedly rearward one, and is defined approximately by the inner and outer limits 46 and 47 respectively. The path of an axial ray 48 extends through the surface 43, is then reflected by the surface 42 and directed rearwardly and obliquely into the tube 10. The lens 41 receives the light rays and redirects them longitudinally through the tube 10 to the eye-piece.

In Figure 5 I have illustrated a modified form which employs a double-acting prism 28 in place of the eccentric lens 24. The employment of such a prism renders the construction of the device extremely inexpensive. In this form of the invention the objective 29, corresponding to the objective 16 of Figure 1, is arranged with a flattened portion 30 in an opening 31 corresponding to the opening 13. The opening 31 is, however, more nearly perpendicular to the tube axis, and the plane surface 32 of the hemispherical objective 29 is in this form arranged in an oblique manner opposite to that of the surface 17.

The field of vision commanded by the instrument of Figure 5 is substantially defined by the inner and outer limits 32 and 33 respectively, and the path of travel of an axial ray 34 extends through the surface 30 into reflection from the surface 32 and thence along a line 35 obliquely rearwardly into the tube 10.

The prism 28 has a forward light-receiving surface 36 substantially perpendicular to the rearwardly directed ray 35, an opposite side surface 37 forming an acute angle with the surface 36 and a rear preferably convex surface 38. It will be understood that the rear portion of the prism 28 is of circular cross-section whereas the forward portion is wedge-shaped as shown. The surfaces 36 and 37 are so arranged that the light ray 35 (and similar corresponding rays) will pass through the surface 36 and will impinge upon the surface 37 as a reflecting surface. The latter surface may be silvered if desired. This internal reflection redirects the ray against the forward surface 36 in a direction which causes the latter to re-reflect the ray by internal reflection into a rearward direction substantially longitudinal.

A suitable backing 38′, corresponding to 27 of Figure 1 is arranged within the offset portion of the elliptical end, and a plug 39 corresponds to the plug 15.

In the construction of the elliptical ends it may be found desirable to construct the offset bore in an auxiliary cylindrical boss, which may subsequently be cemented to the balance of the end to form a complete assembly as shown; but this particular formation of the end portion is a matter of mechanical skill and does not affect the salient features of my invention.

In the embodiments of Figure 1 and Figure 5, it will be noted that the inner limits 21 and 32 of the rearwardly oblique fields of vision are not entirely parallel to the longitudinal axis of the tube but diverge therefrom to a slight degree. This permits of the employement of an illuminating lamp arranged closely adjacent to the tube 10. In other words, the field of vision in each case is rearwardly oblique and the innermost limit skirts the tube 10 in such a manner that a lamp tube closely adjacent to the tube 10 will be excluded from the field. This prevents the lamp from blinding the observer and enables the lamp at the same time to be advantageously positioned in an efficient manner for illuminating the main portion of the field.

With respect to a change of medium in the field of vision, it will be noted that the embodiments of Figures 4 and 5 are particularly advantageous in retaining the rearward vision even in a water medium. In other words, although the conical fields of vision may become narrowed when the instrument is employed in a water medium or the like, the rearwardness of the field will be retained.

It will thus be observed that I have provided a telescopic device which is extremely simple in structural nature and which embodies all the desirable characteristics of compactness and light-transmitting qualities. The provision of a reflecting objective of the character shown in combination with auxiliary optical means for redirecting the transmitted rays in a longitudinal direction has proven to be highly advantageous in providing an instrument which is both simple yet compact. The combination of elements illustrated and described permits me to provide an instrument having a minimum cross-sectional area throughout the body thereof and throughout the necessarily slightly enlarged end portion.

It will be understood that the light ray paths are of necessity somewhat complicated and difficult to represent. Accordingly, the paths indicated are intended to indicate merely the general nature of the construction and are not intended to be accurate representations. Similarly, the fields of vision are merely approximately indicated in the drawings. In general, the details of construction and the proportionate sizes and dispositions of the elements will of necessity require careful adjustment depending upon circumstances. Thus, many changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays by internal reflection obliquely rearwardly into the tube, and (2) auxiliary optical means back of said lens for receiving said rays and directing them longitudinally through the tube.

2. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays obliquely rearwardly into the tube, and (2) auxiliary optical means back of said lens for receiving said rays and directing them longitudinally through the tube, said means comprising a lens defined by an eccentric portion of a symmetrical lens.

3. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays obliquely rearwardly into the tube, and (2) auxiliary optical means back of said lens for receiving said rays and directing them longitudinally through the tube, said means comprising a convex lens defined by an eccentric portion of a symmetrical convex lens.

4. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays obliquely rearwardly into the tube, and (2) auxiliary optical means back of said lens for receiving said rays and directing them longitudinally through the tube, said means comprising a plano-convex lens defined by an eccentric portion of a symmetrical plano-convex lens of a diameter greater than the tube diameter.

5. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays obliquely rearwardly into the tube, and (2) auxiliary optical means back of said lens for receiving said rays and directing them longitudinally through the tube, said means comprising a convex lens defined by an eccentric portion of a symmetrical convex lens whose axis is parallel to but offset (toward said opening) from the tube axis.

6. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays obliquely rearwardly into the tube, and (2) auxiliary optical means back of said lens for receiving said rays and directing them longitudinally through the tube, said means comprising a double acting prism having a light-receiving face substantially perpendicular to the received rays.

7. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays obliquely rearwardly into the tube, and (2) auxiliary optical means back of said lens for receiving said rays and directing them longitudinally through the tube, said means comprising a double acting prism having a front light-receiving face and a side face so arranged with respect to the rays entering the front face as to reflect said rays back onto the front face in directions which will cause said rays to be internally re-reflected into said longitudinal direction.

8. In a surgical telescope, a tube having a front enlarged end, said end having an opening in its exposed rear surface, and an objective system which comprises (1) a substantially hemispherical lens having a portion in said opening and being arranged and constructed to command a rearward field of vision and to direct the light rays obliquely rearwardly into the tube, and (2) a double acting prism back of said lens and so arranged and constructed as to receive said rays and transmit them longitudinally through the tube.

9. In an objective system for a telescope of the character described, a tubular member having an enlarged end, said end having an opening in its exposed rear surface, and an objective lens in said end and comprising a substantial hemisphere having its curved surface rearwardly disposed and having a flattened portion spanning said opening.

10. In a surgical telescope, a tube having a front enlarged end, said end having an opening in its exposed rear surface, and an objective system which comprises (1) an objective having a single reflecting surface and having a light-receiving surface in said opening, said objective being arranged and constructed to command a rearward field of vision and to direct the light rays by internal reflection at said reflecting surface obliquely rearwardly into the tube, and (2) auxiliary optical means back of said objective for receiving said rays and directing them longitudinally through the tube.

11. In a surgical telescope for commanding a rearwardly oblique field of vision, an objective system comprising in combination a plano objective element having its forward surface arranged as a reflecting surface and its rearward surface having a portion arranged to receive the light rays from the field of vision, and (2) an auxiliary back lens for directing the reflected rays longitudinally through the telescope, said last named lens having opposite surfaces defined by an eccentric portion of a theoretical symmetrical plano-convex lens.

In witness whereof, I have signed and sealed this specification this 21st day of July, 1927.

REINHOLD H. WAPPLER.